(12) United States Patent
Leonhardt et al.

(10) Patent No.: US 7,331,056 B2
(45) Date of Patent: Feb. 12, 2008

(54) DATA STORAGE CARTRIDGE HAVING BAFFLES

(75) Inventors: Michael L. Leonhardt, Longmont, CO (US); Michael V. Konshak, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 397 days.

(21) Appl. No.: 10/883,935

(22) Filed: Jul. 2, 2004

(65) Prior Publication Data

US 2006/0005217 A1 Jan. 5, 2006

(51) Int. Cl.
G11B 23/03 (2006.01)
G11B 33/14 (2006.01)

(52) U.S. Cl. ...................... 720/725; 720/648
(58) Field of Classification Search ............... 720/725, 720/648
See application file for complete search history.

(56) References Cited

U.S. PATENT DOCUMENTS

| | | | | |
|---|---|---|---|---|
| 3,707,046 A | * | 12/1972 | De Baun | 55/483 |
| 3,740,735 A | * | 6/1973 | Gabor | 360/97.02 |
| 4,138,703 A | * | 2/1979 | Stave et al. | 360/133 |
| 4,239,108 A | | 12/1980 | Coleman et al. | |
| 4,268,878 A | * | 5/1981 | Kearns | 360/97.02 |
| 4,463,849 A | | 8/1984 | Prusak et al. | |
| 4,609,105 A | | 9/1986 | Manes et al. | |
| 4,636,891 A | * | 1/1987 | Barski | 360/97.02 |
| 5,253,246 A | | 10/1993 | Leonhardt et al. | |
| 5,293,293 A | * | 3/1994 | Iwata et al. | 360/133 |
| 5,297,122 A | * | 3/1994 | Christie | 369/13.34 |
| 5,334,904 A | * | 8/1994 | Kramer | 312/9.57 |
| 5,638,347 A | * | 6/1997 | Baca et al. | 369/30.31 |
| 5,936,935 A | * | 8/1999 | Hanakawa et al. | 720/732 |
| 5,954,197 A | | 9/1999 | Ditzig et al. | |
| 6,285,648 B1 | * | 9/2001 | Philipps | 369/200 |
| 6,567,361 B1 | | 5/2003 | Ohmori | |
| 6,964,335 B1 | * | 11/2005 | Harris | 206/308.1 |
| 2003/0011286 A1 | | 1/2003 | Weisser et al. | |

FOREIGN PATENT DOCUMENTS

JP 2003157640 A 5/2003

* cited by examiner

*Primary Examiner*—Angel Castro
*Assistant Examiner*—Christopher R. Magee
(74) *Attorney, Agent, or Firm*—Brooks Kushman P.C.

(57) ABSTRACT

A media cartridge for use with data storage libraries. The cartridge includes a housing having an opening through which a carrier tray can be loaded and extracted to reveal a media element. A number of baffles are included to limit exposure of the media elements to contamination.

19 Claims, 6 Drawing Sheets

DATA STORAGE CARTRIDGE HAVING BAFFLES

BACKGROUND OF THE INVENTION

1. Field of the Invention

The present invention relates to media cartridges for use in data storage libraries.

2. Background Art

Media cartridges can be used in data storage libraries to house a variety of data storage media element types including magnetic, optical and the like. Media cartridges must provide the media element protection from its environment (handling, contamination, etc.) before, during and after it is transported into and out of active usage. Furthermore the cartridge must accommodate this active usage by providing the read-write mechanisms associated with the media usage direct access to the media. Access is typically accomplished in a variety of ways including sliding/pivoting doors, ports, sections and the like. The conflicting requirements for media element protection along with ready access pose significant challenges to media cartridge design.

Some types of media elements are particularly susceptible to degraded performance arising from contamination within their environment. Contamination can impair the media's functionality including read and write function, stored data integrity, and operational lifetime. Contamination can take many forms but particulate, gaseous and electromagnetic radiation (hereafter termed "radiation") are the most common. For example, it is well known that the close operating tolerances between many magnetic media and their associated read/write transducers make them susceptible to damage from particulate contaminants. Some optical media (particularly holographic optic media) are very susceptible to damage from radiation exposure in the form of light.

From the media cartridge perspective, contamination can have both external and internal sources. External sources tend to be environmentally borne, the wear or aging of the media cartridge's internal parts and media element itself can create an internal source of contamination. Although appropriate design and choice of materials can mitigate many internal sources, external sources remain a risk to media functionality What is needed is a system and method to provide a media cartridge for media element(s) that accommodates the requirements for both ready access to the media element while providing the element with environmental handling and contamination protection.

SUMMARY OF THE INVENTION

It is, therefore, an object of the present invention to provide a media cartridge which protects media element(s) stored therein from a variety of contaminant types while accommodating direct access to the media elements by their appropriate read-write mechanisms. A media drive typically contains these read-write mechanisms along with complementary functions to provide data to and extract data from the media.

The present invention contemplates a media cartridge having a number of features, including a housing having first and second side walls, top and bottom walls, and an end wall that together define a cavity having an opening opposite the end wall. A carrier tray operates within the housing for loading and extracting the media element.

In accordance with another aspect of the present invention, the media cartridge includes multiple baffles to limit exposure of the media element to contamination. The baffles cooperate with each other to provide obstacles around which contaminates must pass to reach the media elements. The baffles can cooperate with each other to provide a labyrinth arrangement through which the contaminants must travel to reach the media elements.

In accordance with one aspect of the present invention, the housing and trays each include baffles that cooperate with each other. The baffles are defined generally by protrusions which extend from the tray and/or housing. The protrusions can take any number of shapes, and preferably define a plurality of elongated ribs such that the ribs of one baffle intersect with the ribs of another baffle to provide the labyrinth structure.

The baffles can be integrally molded into the housing and trays. The baffles can also be separate inserts of plastic, rubber, or other materials adhered to the trays, housing, or other cartridge components. The inserts can be non-deformable and/or deformable, displacing and/or non-displacing pieces that can be snapped-in, glued-in, and the like.

Preferably, the baffles are provided on leading and trailing ends of the carrier tray and on the opening top and bottom side of the housing. The baffles on the leading end of the trays cooperate with the baffles on the opening side of the housing to limit access to the housing cavity when the trays are loaded. The baffles on the trailing ends of the trays cooperate with the baffles on the opening side of the housing to limit access to the housing cavity when one or more of the trays are extracted.

In one aspect of the present invention, a plurality of anti-rattle features are included within the housing to minimize movement of the media and internal cartridge components with respect to the housing thereby minimizing the creation of particulates arising from the contact between these components. Other cartridge components are included to activate the anti-rattle features when the cartridge is closed.

BRIEF DESCRIPTION OF THE DRAWINGS

FIG. 5 illustrates a release mechanism for extracting the carrier trays in accordance with the present invention;

DETAILED DESCRIPTION OF THE PREFERRED EMBODIMENT(S)

Figure 1:
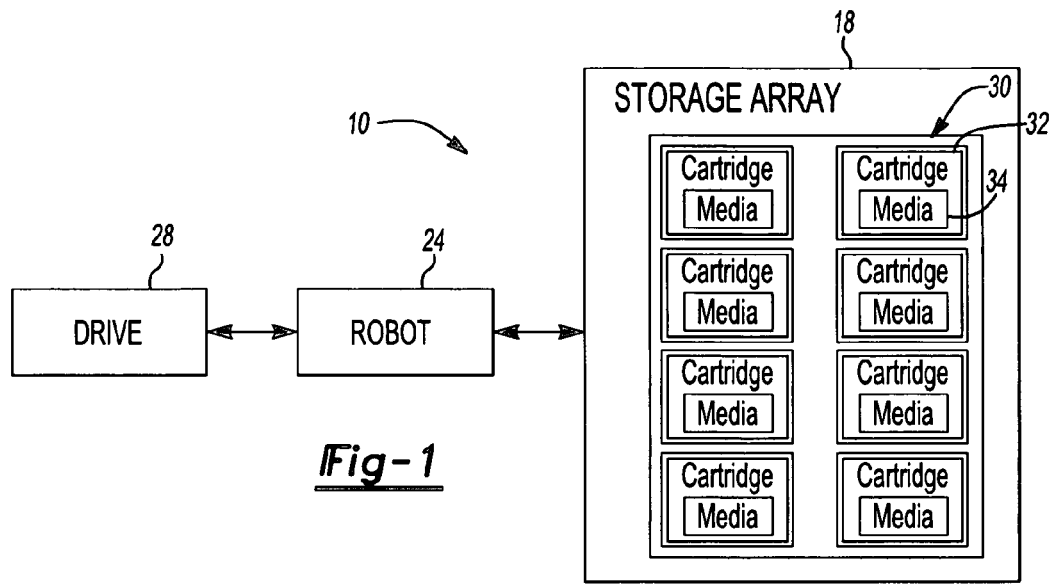
FIG. 1 schematically illustrates a data storage library that may be used in accordance with the present invention.

FIG. 1 schematically illustrates data storage library 10 that may be used in accordance with the present invention. The present invention is not limited to this particular arrangement. More or less components and structures could be used without deviating from the scope and contemplation of the present invention.

Storage library 10 is an exemplary storage library that includes storage array 18, robot 24, at least one drive 28, and a number of cells 30 for storing media cartridges 32. Each media cartridge 32 includes one or more media element(s) 34. Media element 34 is capable of storing data for use by media drive 28. Robot 24 is operable to retrieve and deliver cartridges 32 to media drive 28. The media drive 28 contains read-write mechanisms along with complementary functions to provide data to and extract data from the media element 34.

Figure 2:
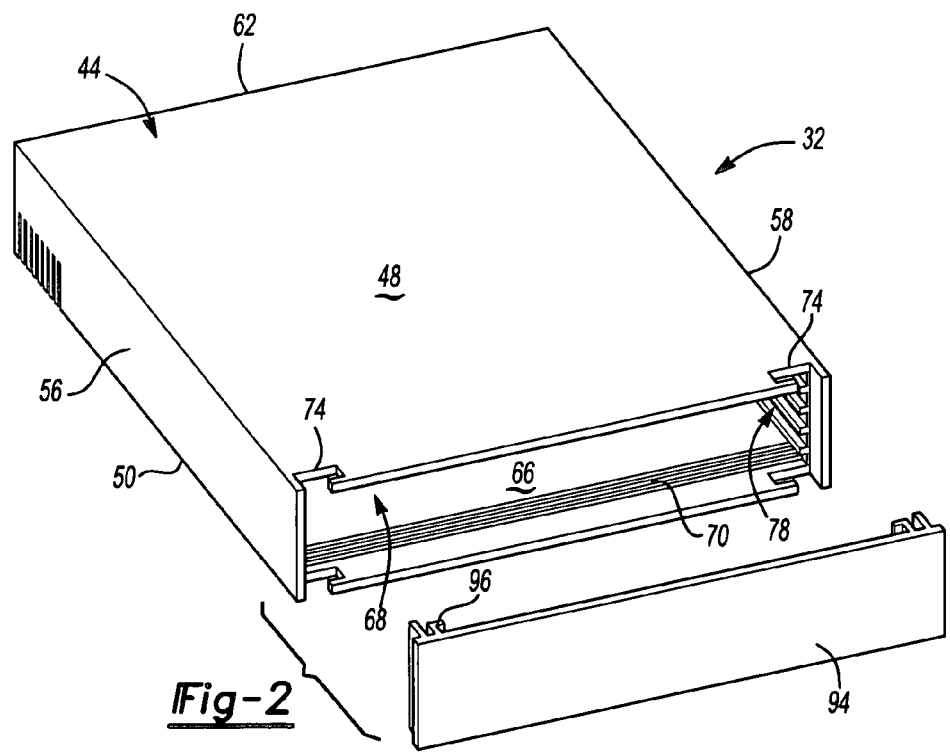
FIG. 2 illustrates a media cartridge that protects media elements from contamination in accordance with the present invention.

FIG. 2 illustrates a media cartridge 32 that limits exposure of media element 34 (not shown for clarity) from a variety of contaminants while accommodating direct access to media elements 34. Media cartridge 32 is especially advantageous in protecting media element 34 from particulate, gaseous and electromagnetic radiation.

The present invention contemplates an exemplary configuration for cartridge 32 that includes housing 44 having top 48, bottom 50, left side 56, right side 58, and end wall 62 for defining opening 66 to cavity 68. Housing 44 includes bottom baffle 70, groove 74, and rails 78. Rails 78 are provided on both left and right side walls 56 and 58 for supporting carrier trays 82 (see FIG. 3).

Cover 94 includes grooves 96 which fit within housing grooves 74 such that covering 94 can cover opening 66 when inserted within grooves 74. Cover 94 provides an additional barrier to contaminates and is for conditions where contaminates may be high, including extended archive periods, transport, warehousing, and the like. Covering 94 can be removed and stored outside the library when cartridge 44 is in use.

Figure 3:
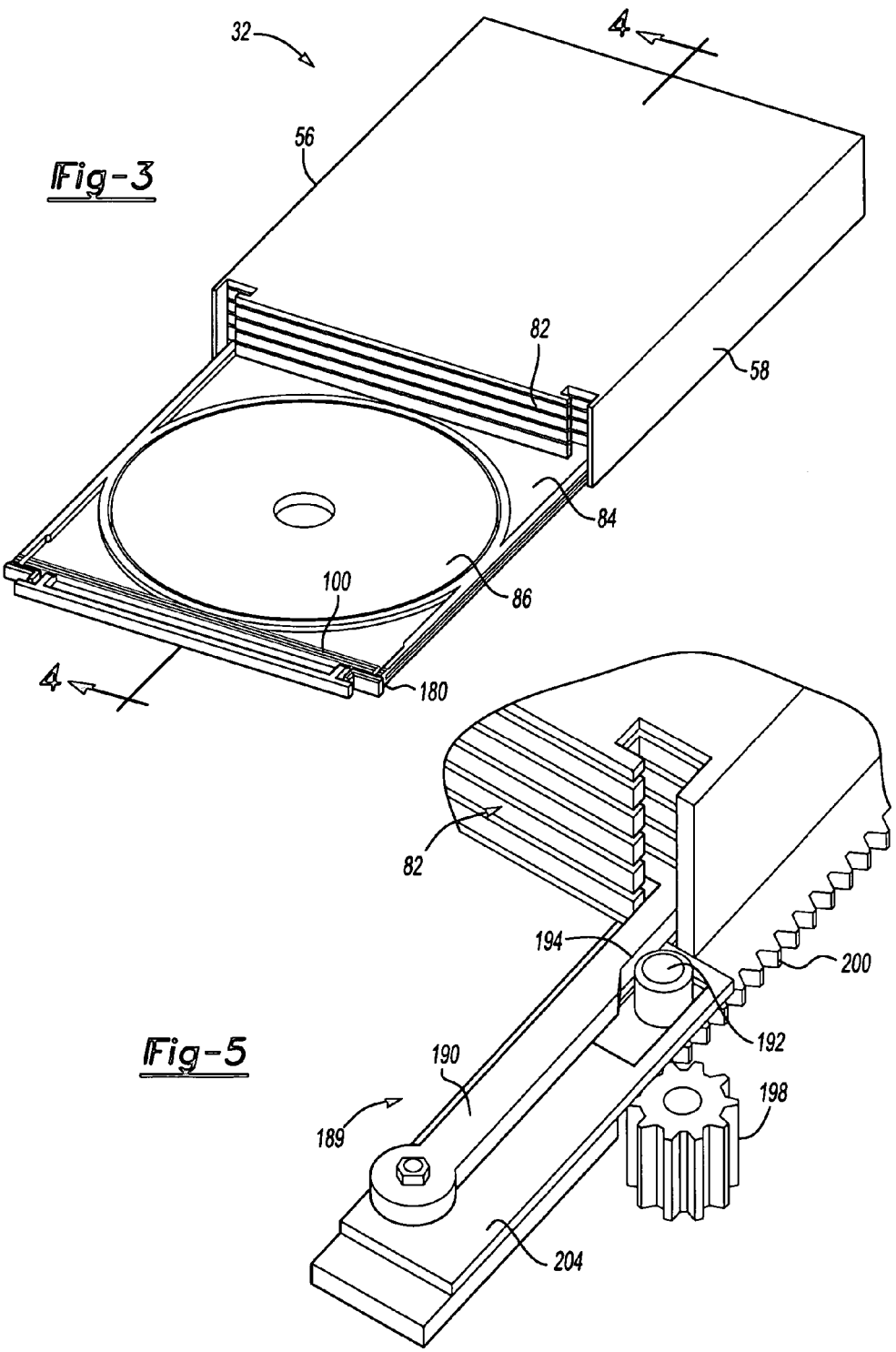
FIG. 3 illustrates a carrier tray in an extracted position in accordance with the present invention.

FIG. 3 illustrates media cartridges 32 being loaded with a number of carrier trays shown generally by reference numeral 82. An extracted carrier tray is referred to with reference numeral 84. Extracted carrier tray 84 carries media element 86 and is extracted from cavity 68. (See FIG. 2) Preferably, rails 78 (see FIG. 2) are sufficiently sized relative to trays 82, 84 to limit contaminates from reaching media element 86 though openings or gaps between rails 78 and trays 82.

Data can be read from and written to media element 86 in the extracted position. Alternatively, media 86 can be extracted from tray 84 for access. Carrier tray 84 includes baffle 100 at the leading end of tray 82, 84. Baffle 100 protects media element 86 from contamination and is generally referred to as lengthwise baffles which extends horizontally across housing opening 66. (See FIG. 2) Baffle 100 is generally a protrusion, and as shown in an exemplary embodiment shaped as three elongated ribs. Other shapes and configurations could similarly be used without deviating from the scope and contemplation of the present invention.

FIG. 3 further illustrates latch mechanism 180 which is operable to secure tray 84 in housing 44 when loaded. Baffle 100 extends to latch 180 to limit contamination from entering housing 44 by way of latch 180. Latch mechanism 180 is biased by natural tension of its material against a catch (not shown) in right side wall 58 to lock carrier tray 84 in housing 44 when it is loaded therein. The biasing can be overcome with force in a lateral direction towards a central portion of the carrier tray 84 to flex latch 180 so that it can be unlocked and carrier tray 84 extracted from housing 44.

Figure 4:
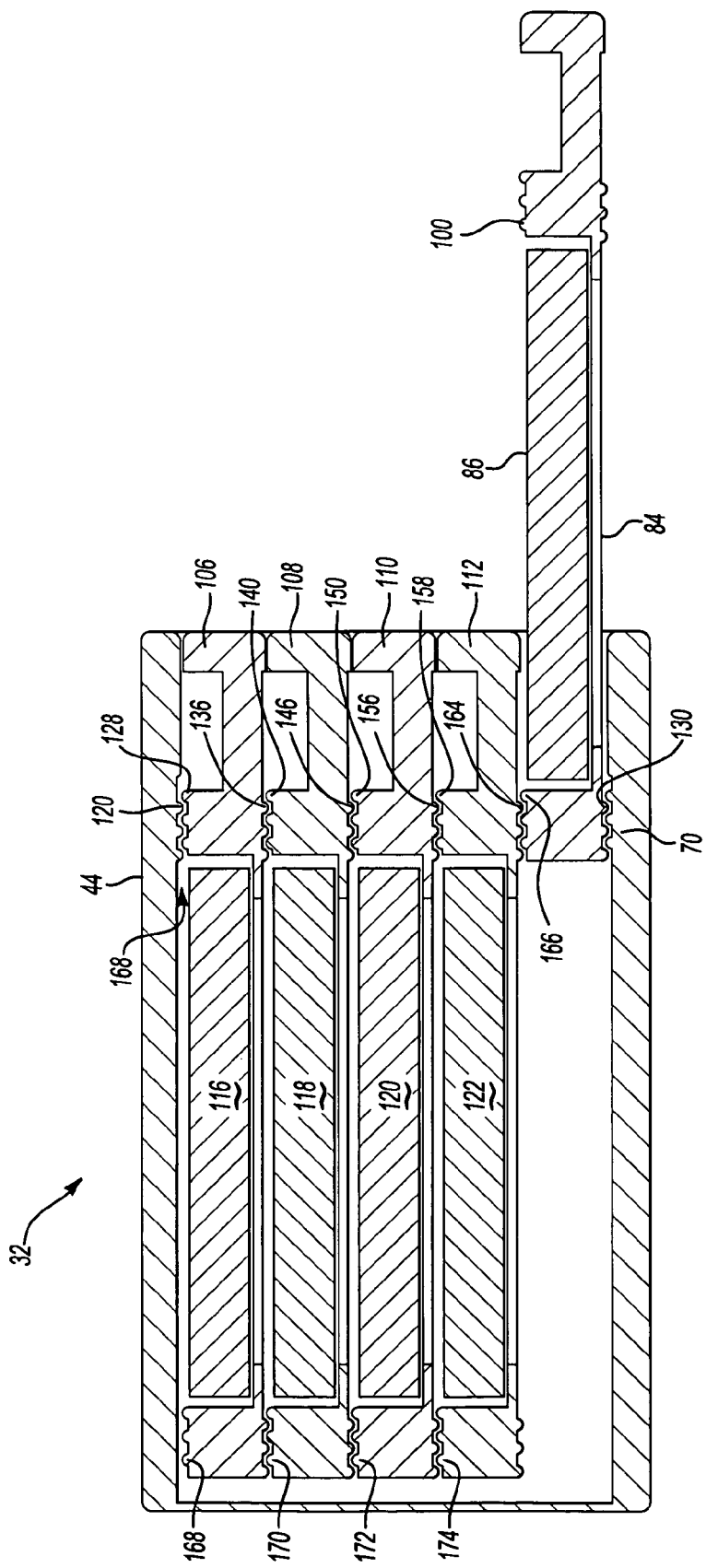
FIG. 4 illustrates a cross-sectional view of the media cartridge shown in FIG. 3.

FIG. 4 illustrates a cross-section view taken along line 44 in FIG. 3 to show the operation of cartridge 32 in more detail. The loaded carrier trays 82 are shown in more detail as first tray 106, second tray 108, third tray 110, fourth tray 112. Media elements 116, 118, 120, and 124 are carried by trays 106, 108, 110, and 112, respectively.

Housing 44 includes top baffle 120 and bottom baffle 70 cooperating with top-front and bottom-front baffles 128 and 130 of first and fifth trays 106 and 84 respectively. First tray 106 further includes bottom-front baffle 136 to cooperate with top-front baffle 140 of second tray 108. Second tray 108 includes bottom-front baffle 146 to cooperate with top-front baffle 150 of third tray 110. Third tray 110 includes bottom-front baffle 156 to cooperate with top-front baffle 158 of fourth tray 112. Fourth tray 112 includes bottom-front baffle 164 to cooperate with top-rear baffle 166 of fifth tray 84 when tray 84 is extracted.

Trays 106, 108, 110, and 112 similarly include rear baffles 168, 170, 172, and 174 respectively for protection when trays 106, 108, 110, 112 and 84 are extracted. Each baffle cooperates with another baffle such that contaminates must meander through a labyrinth structure provided by the cooperating baffles to reach the media elements 116, 118, 120, and 122.

To facilitate the movement of trays 106, 108, 110, 112 and 84, clearance 168 is provided between each tray 106, 108, 110, 112 and 84. Because contaminates could enter through clearance 68, each baffle extends relative to its respective tray into clearance 68. For example, top-front baffle 120 of housing 44 substantially extends into clearance 68 to obstruct the flow of contaminates therethrough. Preferably, each cooperating baffle extends at least half way into its respective clearance such that the cooperating baffles must contact one another when the trays are being loaded and extracted.

For example, baffle 120 of housing 44 extends past a midway point of clearance 168, as does baffle 128 of tray 132. Further, baffle 120 is preferably laterally offset from baffle 128 such that when first tray 132 is loaded, each rib intersects with a cooperating rib. In this manner, contamination must meander through a labyrinth of baffles to contaminate media element 116. This obstructed path substantially reduces the likelihood that particulate, gaseous or radiative contamination can reach media element 116.

The present invention contemplates other configurations for the baffles and is not limited to such a labyrinth arrangement where each baffle includes three protruding portions. One or more protrusions or ribs can comprise a baffle and is contemplated by the present invention. For example, contamination protection is also achieved if baffles 120 and 128 are replaced with a single protrusion on carrier 106 if the single protrusion is sufficiently sized and shaped to contact housing 48 when loaded. Such a single protrusion would preferably be fabricated from a deformable material.

FIG. 4 illustrates each baffle as an integrated portion of the component to which it is affixed. The carrier trays and housing are typically a molded plastic, whereby the baffles are similarly molded. The present invention contemplates that the baffles may be separate inserts which are not integrally manufactured with the component to which it is affixed.

The baffles can also be separate inserts of plastic, rubber, or other materials adhered to the trays and housing. The inserts can be non-deformable and/or deformable, displacing and/or non-displacing pieces that can be snapped-in, glued-in, and the like.

FIG. 5 illustrates release mechanism 189 for extracting carrier trays 82. The release mechanism 189 includes lever 190 and pin 192 to provide lateral movement of latch 180 (see FIG. 3). Lever 190 includes angled channel 194 such that gear mechanism 198 can retract lever 190 by engaging teeth 200 to move pin support 204, and thereby lever 190 and pin 192. This action causes pin 192 to also move rearward against angled channel 194 to produce the lateral movement which unlocks latch 180. Thereafter, continued movement allows lever 190 to grip tray 84 and extract it from housing 44.

Figure 6:
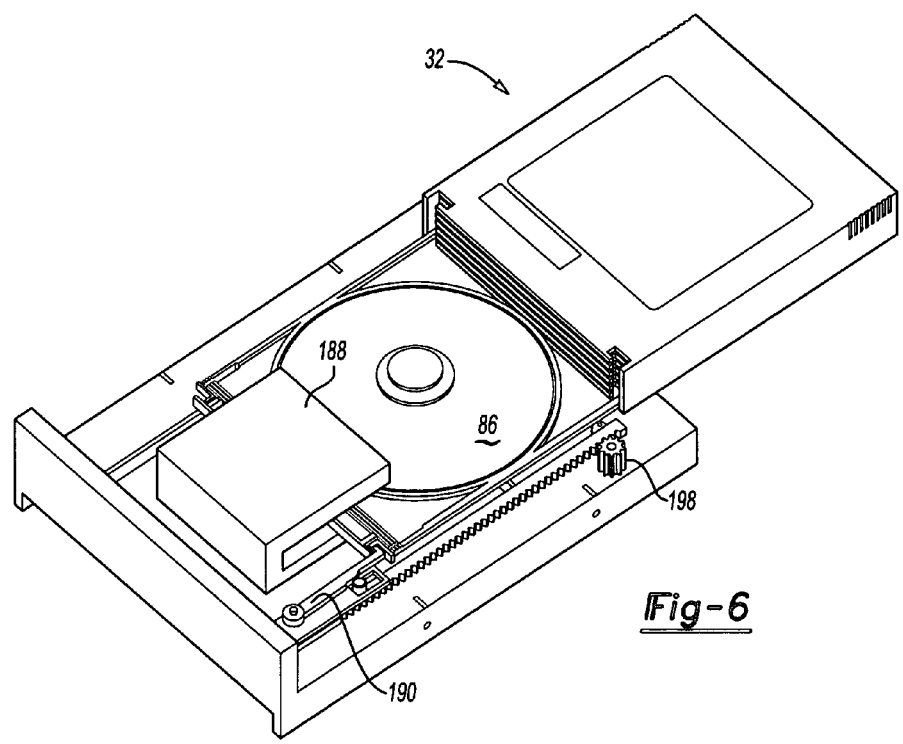
FIG. 6 illustrates an extracted media element positioned relative to a drive in accordance with the present invention.

An example of the read/write positioning of tray 84 is shown in FIG. 6. In this extracted position, media element 86 is positioned proximate mechanism 188 such that mechanism 188 can read and write to media element 86. Once the desired operation is complete, gear mechanism 198 moves tray 84 in a rearward direction to load it into housing 44, whereby lever 190 releases tray 84. Robot 24 can then move gripper 186 to another tray or move gripper 186 to another cartridge in library 10 to perform similar operations. Other possible read/write positioning configurations are possible wherein media element 86 is removed partially or wholly to accommodate single or double sided media access by an appropriate mechanism.

Figure 7:
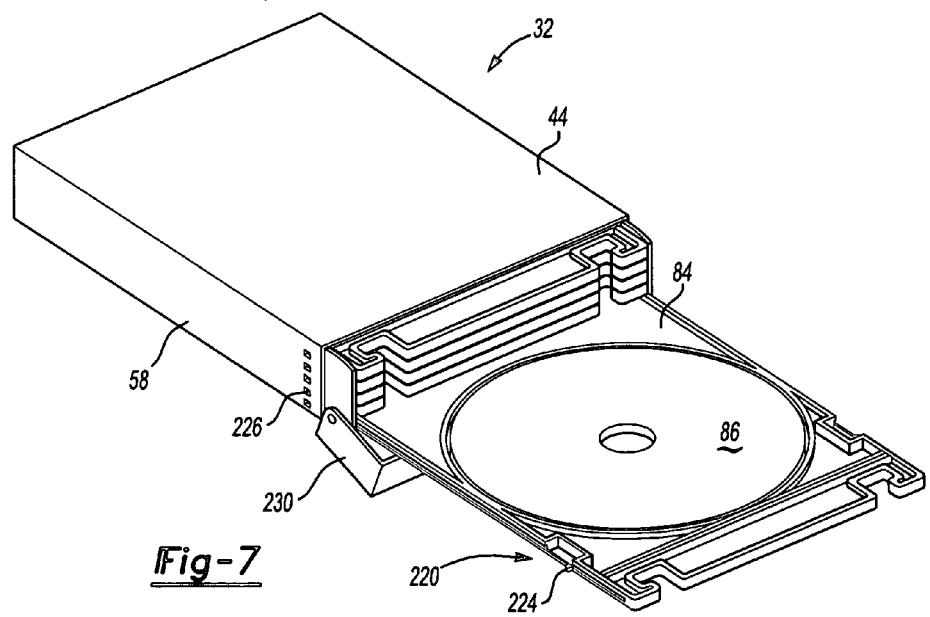
FIG. 7 illustrates the carrier tray having a latch in accordance with the present invention.

FIG. 7 illustrates an alternative embodiment for trays 84, 106, 108, 110, and 112 having latch 220. latch 220 includes detent 224 that is biased when loaded to engage relief 226 in right side wall 58. To extract tray 84 and release latch 220, a gripper pulls on tray 84 with sufficient force to cause detent 224 to release from relief 226.

FIG. 7 also illustrates a permanent covering 230 that is fixedly hinged to housing 44. Covering 230 can be used in place of the removable covering 90, shown in FIG. 2, so that covering 230 can stay with cartridge 32 at all times. Covering 230 would not have to be stored separately from cartridge 32 when not in use.

Figure 8:
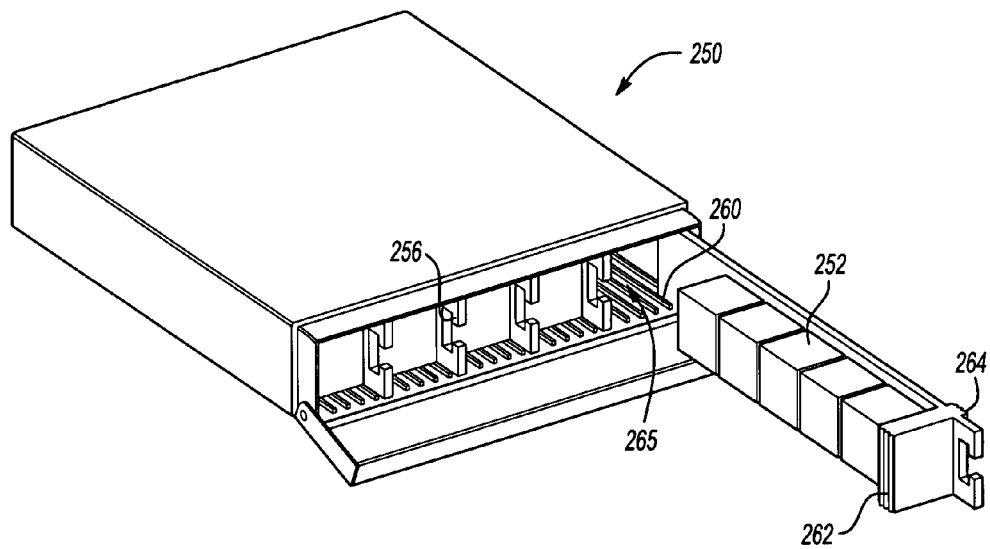
FIG. 8 illustrates another media cartridge for use with rectangular solids formed factor media elements, such as holographic optical media, in accordance with the present invention.

FIG. 8 illustrates one embodiment of media cartridge 32, referred to hereinafter as media cartridge 250, in accordance with one aspect of the present invention. Media cartridge 250 is configured for use with media elements 252 that have a rectangular solid form factor (e.g., holographic media elements). In contrast to the horizontally mounted trays of cartridge 32, cartridge 250 includes vertically mounted trays 256 and rails 260. Trays 256 include left and right side baffles 262 and 264 that operate like the baffles described above and are generally referred to as widthwise baffles which extends vertically across housing opening 265. In particular, each tray includes left and right side baffles which cooperate with left and right side baffles on the other trays and left and right side baffles of the housing to protect holographic cubes 252 from contamination.

Figure 9:
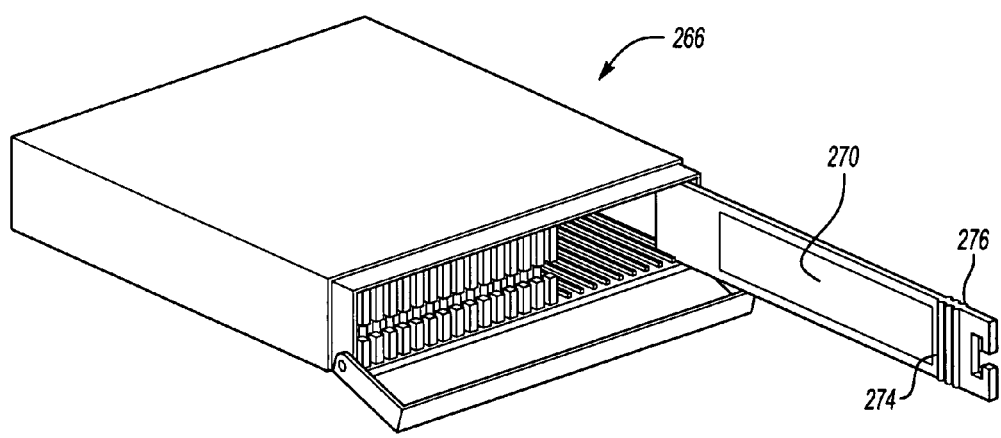
FIG. 9 illustrates yet another media cartridge for use with low profile rectangular solid form factor media elements in accordance with the present invention.

FIG. 9 illustrates one embodiment of media cartridge 32, referred to hereinafter as media cartridge 266, in accordance with one aspect of the present invention. Media cartridge 266 is configured for use with media elements 270 that have a low profile form factor. Each tray includes left and right side baffles 274 and 276 which cooperate with left and right side baffles on the other trays and left and right side baffles of housing to protect media elements 270 from contamination.

Figure 10:
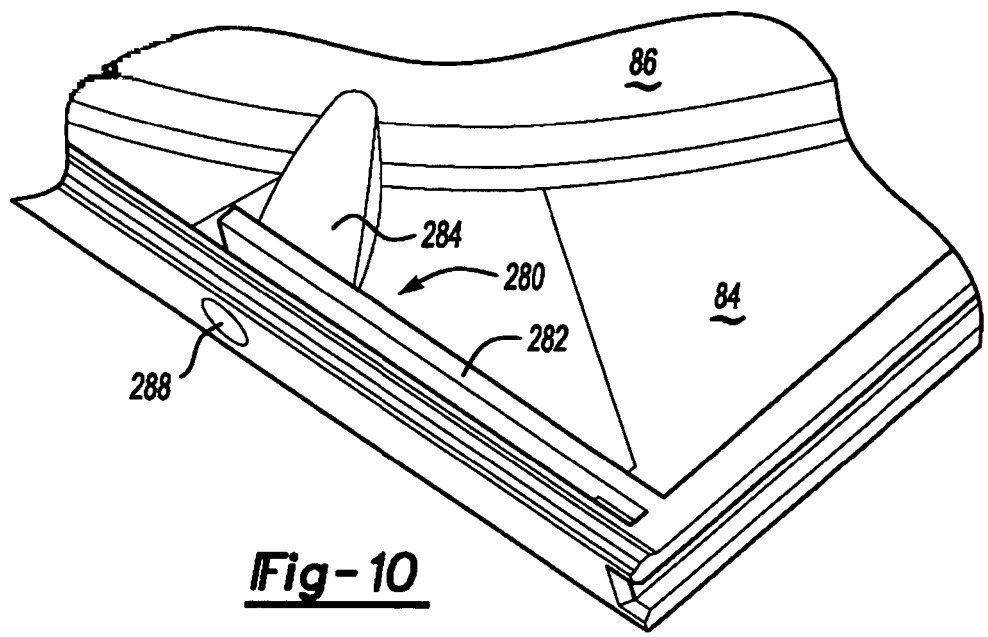
FIG. 10 illustrates an anti-rattle feature in accordance with the present invention.

FIG. 10 illustrates anti-rattle feature 280 that limits motion of tray 84 and storage element 86 with respect to housing 44 in accordance with the present invention. Anti-rattle feature 280 is integrated with carrier tray 84 and includes lever 282 having protrusion 284. Opening 288 is provided at the rear loading end of tray 84 such that a pin or other feature in housing 44 can extend through opening 288 to press protrusion 284 over top of (as shown) or against media element 86. Rattling or other motion between media element 86 and tray 84 is limited, and thereby, particulate contamination from such action is also limited.

Figure 11:
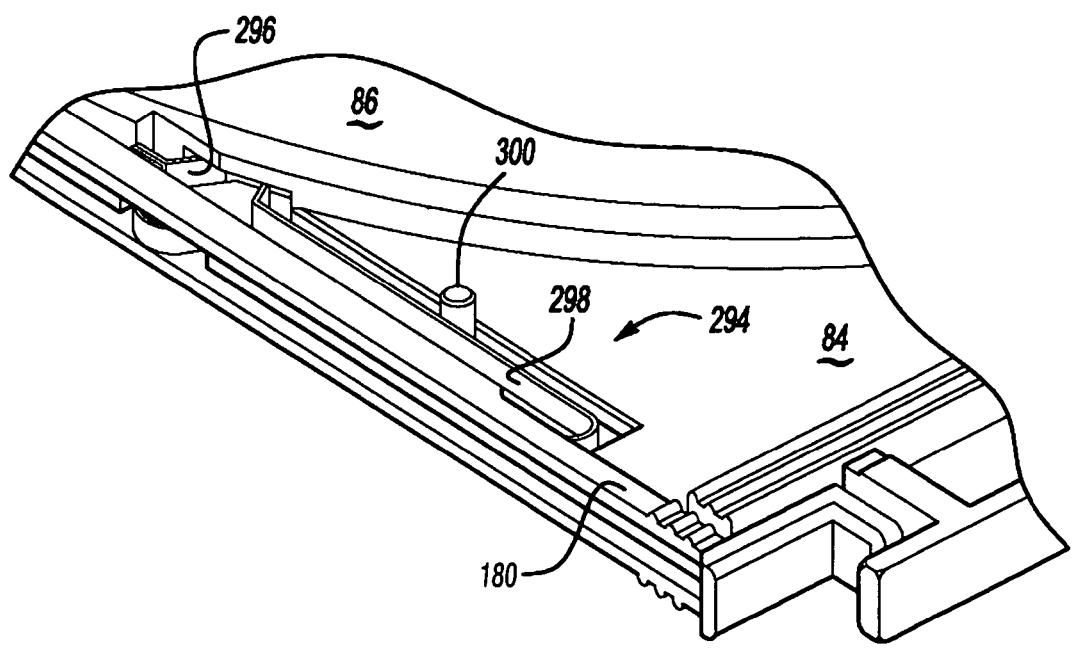
FIG. 11 illustrates another anti-rattle feature in accordance with the present invention.

FIG. 11 illustrates anti-rattle feature 294 in accordance with another aspect of the present invention. Anti-rattle feature 294 provides dual functionality in that it provides biasing for latch 180 and also limits motion of media element 86 and tray 84. In the loaded position, spring detent 296 is biased by separate spring 298 to extend over top of or against (as shown) media element 86. When tray 84 is extracted, the force on latch 180 by release mechanism 189 causes spring 298 to flex around pin 300 such that spring detent 296 is released from media element 86. Rattling or other motion between media element 86 and tray 84 is limited, and thereby, particulates generated and subsequent contamination from such motion is also limited.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A media cartridge, the cartridge comprising:
   a housing defining an opening to a cavity within the housing;
   a carrier tray for carrying a media element, the carrier tray operable within the cavity for loading and extracting the media element through the opening;
   a plurality of baffles in the media cartridge cooperating to limit exposure of the cavity to contamination when the media element is loaded and extracted through the opening;
   wherein the carrier tray further comprises a latch to secure the carrier tray within the housing when the carrier tray is loaded within the housing; and
   wherein the latch includes a baffles.

2. The cartridge of claim 1 wherein at least one baffle is on the carrier tray and cooperates with another baffle on the housing.

3. The cartridge of claim 2 wherein the baffles protrude outwardly from to the housing and the carrier tray.

4. The cartridge of claim 3 wherein the baffle on the carrier tray is laterally offset from the baffle on the housing when the tray is loaded within the housing.

5. The cartridge of claim 4 wherein the baffle on the carrier tray overlaps the baffle on the housing.

6. The cartridge of claim 1 wherein the cartridge further comprises each of the plurality of trays including at least one baffle cooperating with at least one baffle on another of the plurality of trays.

7. The cartridge of claim 6 wherein the housing includes a baffle cooperating with a baffle of at least one of the two carrier trays.

8. The cartridge of claim 1 wherein the baffles extend vertically widthwise across the housing opening.

9. The cartridge of claim 1 wherein the baffles extend horizontally lengthwise across the housing opening.

10. The cartridge of claim 1 wherein the carrier includes an anti-rattle element to limit motion between the housing, the media element, and the carrier tray when the carrier tray is loaded within the housing.

11. The cartridge of claim 10 wherein the anti-rattle element is a lever on the carrier tray that is actuated by a protrusion within the housing contacting the lever when the carrier tray is loaded.

12. The cartridge of claim 10 wherein the anti-rattle element is a spring on the carrier tray that flexes a lever against the media element when the tray is loaded.

13. The cartridge of claim 1 wherein the carrier tray includes baffles on a leading and trailing end, the leading end proximate the housing opening when the tray is loaded into the housing and the trailing end proximate the opening when the tray is extracted from the housing, whereby the baffle on the leading end limits contaminates from entering the housing when the tray is loaded and whereby the baffle proximate the trailing end limits contaminants from entering the housing when the tray is extracted.

14. The cartridge of claim 1 further comprising a door configured to be removable attached to cover the opening to limit exposure of the media element to contamination when the door is closed.

15. A media cartridge for holding a plurality of data storage media, the media cartridge comprising:
    a housing defining an opening;
    a plurality of media carriers disposed within the housing, each media carrier carrying at least one data storage medium, each media carrier sliding through the opening thereby permitting access to the at least one carried data storage medium, each media carrier having a front portion positioned near the opening when the media carrier is seated within the housing and a rear portion positioned near the opening as the media carrier is extracted through the opening;
    a plurality of raised baffles cooperating to limit access to the housing through the opening, each media carrier having at least one of the plurality of raised baffles disposed on the media carrier front portion thereby creating a labyrinth structure in conjunction with at least one of the plurality of raised baffles disposed on an adjacent media carrier front portion;
    wherein the carriers further comprises a latch to secure the carrier tray within the housing when the carrier tray is loaded within the housing; and
    wherein each latch includes a baffle.

16. The media cartridge of claim 15 wherein the plurality of raised baffles is a first plurality of raised baffles, the media cartridge further comprising a second plurality of raised baffles, each media carrier having at least one of the second plurality of raised baffles disposed on the media carrier rear portion thereby creating a labyrinth structure in conjunction with at least one of the first plurality of raised baffles disposed on an adjacent media carrier front portion when the media carrier is extracted through the opening and the adjacent media carrier is seated within the housing.

17. A method of protecting data storage media within a media cartridge, the method comprising:
    locating the media on a media carrier slideably insertable into the media cartridge, wherein the media carrier includes a latch having a baffle, the latch used to secure the carrier tray within the media cartridge when the media carrier is loaded in the media cartridge;
    sliding the media carrier into the media cartridge so that, when the media carrier is seated within the media cartridge, at least the baffle disposed on the latch is positioned adjacent to at least one second baffle within the media cartridge, whereby the at least one first baffle and the at least one second baffle form a first labyrinth structure limiting access to an interior space of the media cartridge;
    sliding the media carrier at least partially out of the media cartridge so that at least one third baffle disposed on the media carrier is positioned adjacent to the at least one second baffle, whereby the at least one third baffle and the at least one second baffle form a second labyrinth structure limiting access to an interior space of the media cartridge.

18. The method of claim 17 wherein the media carrier is a first media carrier and wherein the at least one second baffle is disposed on a second media carrier located adjacent to the first media carrier within the media cartridge.

19. The method of claim 17 wherein the at least one second baffle is disposed on an interior surface of the media cartridge.

* * * * *